United States Patent [19]

Fechter et al.

[11] 4,051,714
[45] Oct. 4, 1977

[54] SONIC SIGNALLING TRANSDUCER

[76] Inventors: Harry Robert Fechter, 2298 Capistrano, Las Vegas, Nev. 89121; Peter Hood, 4721 Royce Road, Irvine, Calif. 92715

[21] Appl. No.: 704,547

[22] Filed: July 12, 1976

[51] Int. Cl.² .......................................... G01M 3/24
[52] U.S. Cl. ............................................... 73/40.5 A
[58] Field of Search ................ 73/40.5 A, 40.5 R, 40

[56] References Cited
U.S. PATENT DOCUMENTS

| | | | |
|---|---|---|---|
| 2,617,134 | 11/1952 | Barton, Jr. | 73/40.5 A X |
| 2,924,966 | 2/1960 | En Dean et al. | 73/40.5 A |
| 2,951,362 | 9/1960 | En Dean et al. | 73/40.5 R |
| 3,016,733 | 1/1961 | En Dean et al. | 73/40.5 R |
| 3,117,453 | 1/1964 | Ver Nooy | 73/40.5 R X |
| 3,817,086 | 6/1974 | Dorgebray | 73/40.5 R |

*Primary Examiner*—Richard C. Queisser
*Assistant Examiner*—Joseph W. Roskos

[57] ABSTRACT

A method and apparatus for detecting a leak in a pipeline and initiating, at the leak location, a sonic signal in the stream fluid, the signal being of a magnitude and character to be detected at remote upstream and downstream stations for location of the leak by known computations based on the time differential between the arrival times of the signals at the remotely spaced stations.

7 Claims, 2 Drawing Figures

SONIC SIGNALLING TRANSDUCER

BACKGROUND OF THE INVENTION

A primary object of the invention resides in the provision of a ferret-type leak detector including means for signaling the presence of a leak as the ferret passes thereover with improved means for the generations of sonic signals within the fluid stream for detection at stations both upstream and downstream of the leak aperture and comparison of the differential of signal arrival times for determining the leak location.

Another object is to provide a ferret of the type which houses leak detection apparatus with means for generation of sonic signals in opposite directions through a fluid stream while utilizing major structure of the detection ferret as components of the sonic signal generator.

A further object is to provide a fluid pipeline leak detector ferret with improved means operable in response to a leak detector signal to actuate a pressurized gas driven transducer for generation of sonic waves which travel in opposite directions within the fluid stream for detection at stations up and downstream of the leak.

Other objects and advantages will become apparent to persons skilled in the art upon examination of the drawings and the following description.

DETAILED DESCRIPTION

Figure 1:
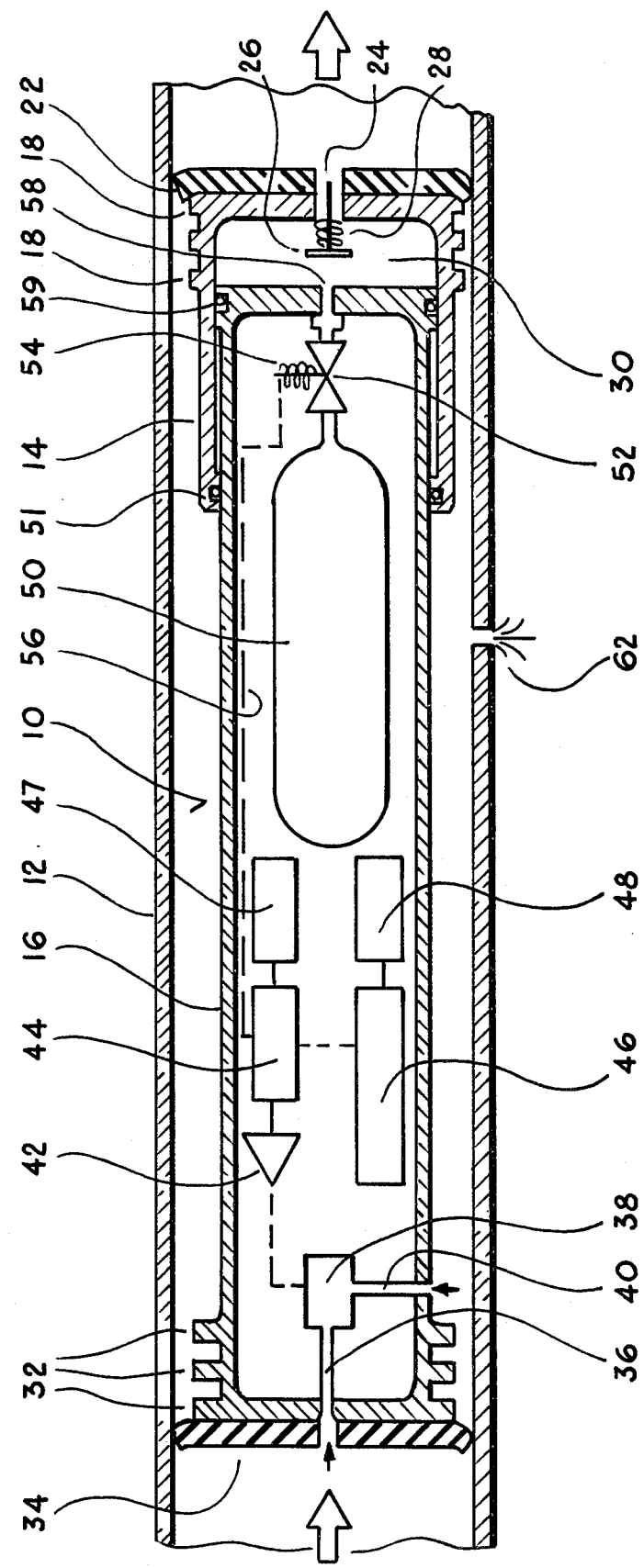
FIG. 1 is a diametric vertical section of a ferret-type leak detector within a pipeline and incorporating the invention.

As shown in the drawings, leak detection ferret 10, disposed within a pipeline 12, comprises an elongate body portion which includes a cylinder defining element 14 and a piston forming element 16. The downstream (arrow direction) end portion of element 14 is externally provided with a plurality of radially extending axially spaced baffles 18 of lessor diameter than pipeline 12. Adjacent the outermost baffle 18 is packing element 22 having circumferential portions in light fluid sealing contact with the pipeline inner wall surface. A bore 24 extends axially through element 22 and the head of cylinder 14 and check valve 26, normally biased open by a helical spring 28, extends into a compression chamber 30 formed between the valved end of cylinder 14 and the downstream end of piston forming member 16.

The upstream end of piston forming member 16 is provided with a plurality of radial baffles 32 similar to baffles 18, above described, and with a trailing packing element 34. An axially extending passageway 36 exposes one side of differential sensor 38 to upstream fluid pressures while passageway 40 exposes the opposite side of sensor 38 to fluid pressures within a bounded area between the packing elements 22 and 34. Electronics associated with sensor 38, all enclosed within piston forming element 16, includes an amplifier 42, a solenoid actuating circuit 44, a recorder 46 and battery supplies 47 and 48.

The opposite end of element 16 has concentrically disposed therein a pressurized gas cartridge 50, a gas release valve 52 and a solenoid 54, connected by conduit 56 to circuit 44 for actuation by an amplified signal from sensor 38 to effect substantially instantaneous release from cartridge 50 of the pressurized gas, such as $CO_2$. A bore 58 conducts the released gas into chamber 30. The piston end of element 16 and the open end of cylinder 14 are provided with spaced circumferential channels in which are disposed sealing rings, such as rings 51 and 59, which may be O-rings. The piston head radially projects outwardly in the area of ring 59 for contacting engagement at the end of the piston stroke with and inwardly projecting radial portion of cylinder 14 in the area of ring 51.

In operation, as ferret 10 passes over a leak such as shown at 62, the differential between the upstream fluid pressure applied through passageway 36 to one side of sensor 38 and the reduced pressure due to the leak in the bounded fluid between packing elements 22 and 34 as applied to the opposite side of sensor 38 initiates a signal indicative of the leak. That signal, fed through amplifer 42 to circuit 44, energizes solenoid 54 to trigger valve 52 open with resultant rapid release of the compressed gas through bore 58 into chamber 30, closing valve 26 and driving the piston head of element 16 and the closed end of cylindrical element 14 apart. Packing elements 22 and 34 are thus rapidly driven in down and upstream directions to generate oppositely directed sonic waves in the stream fluid. The initial gas pressure in cartridge 50 may be selected to result in blocking elements 22 and 34 driven apart at a rate to insure generation of sonic waves of relatively long wavelength. Low frequency sonic waves travel appreciably farther through liquid than do those of higher frequencies.

Chamber 30 is preferably of small volume for maximum pressure application to the head of piston 16 and to the end wall cylinder 14 following release of the pressurized gas from cartridge 50.

As ferret 10 moves downstream with the pressurized fluid in pipeline 12 the upstream pressure urges packing element 34, hence piston 16 to the right as viewed in FIG. 1. Since the fluid stream is blocked from flowing around element 34, and element 22 is subjected to some degree of back pressure from the stream, even with valve 26 open, the stream exerts oppositely directed forces on the piston and cylinder assembly to urge the piston into the cylinder sufficiently to maintain chamber 30 at a small size required to insure that upon release of the pressurized gas elements 22 and 34 will be driven apart by very high applied forces.

The gas is released into chamber 30 as a step function with a fourier integral spectrum ranging from maximum at d.c. to $o$ at $\omega = oo$. The step must be maintained long enough that the loss of high frequencies at the receiving end does not prevent the step from reaching approximately full value, as shown in FIG. 2.

Figure 2:
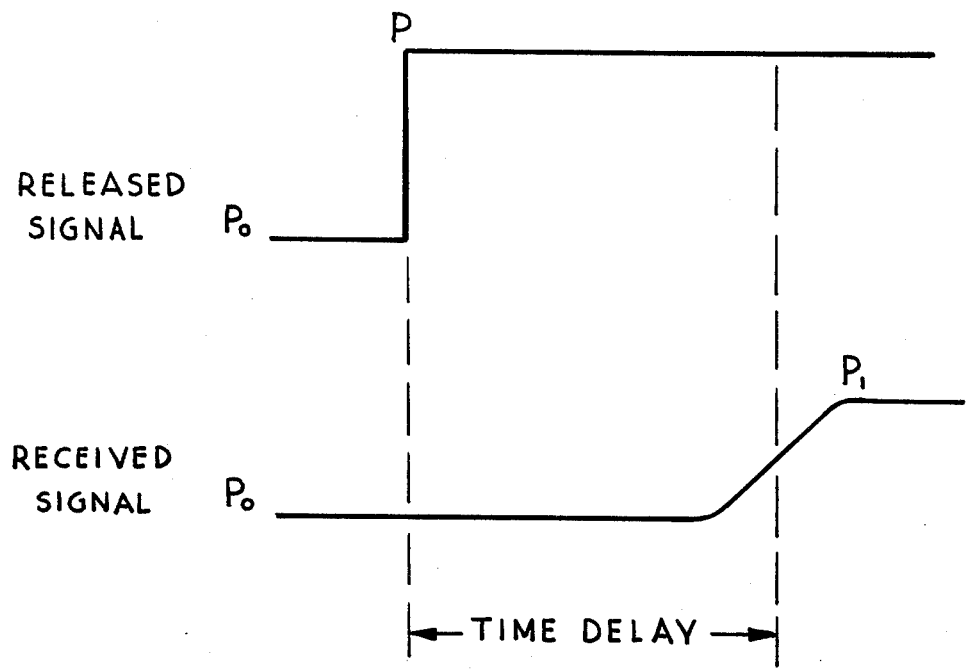
FIG. 2 illustrates the time delay between a signal as released at a leak and is received at a remote station.

Thus, the driving force of released gas, after instantly closing valve 26, continues the step function shown in FIG. 2 to cause cylinder 14 and piston 16, hence blocking members 22 and 34 to be propelled apart by a pulsed surge sufficient to establish sonic signals which are clearly distinguishable from normal pipe noises, when received at spaced stations after a time delay as in FIG. 2.

We claim:

1. A method of locating and recording at remote stations the location of a leak in a pipeline through which a stream of pressurized fluid flows, consisting of the steps of a. Inserting a ferret including a cylinder and a piston, each of which is provided with a member substantially obstructing fluid flow therepast, said members being spaced axially of the pipe, b. And employing pressure change in the ferret resulting from fluid flow through a pipeline leak aperture to effect release of pressurized gas and resultant propulsion of the piston within the cylinder for generation of sonic waves through the pipeline fluid in both upstream and downstream directions.

2. The method of claim 1 wherein the members substantially obstructing fluid flow therepast are of a diameter less than the inside diameter of the pipeline.

3. The method of claim 1 wherein both the cylinder and piston are of an outside diameter substantially less than the interior diameter of the pipeline to define an annular space therebetween.

4. A device of the character described for locating and recording a leak in a pipeline through which a stream of pressurized fluid flows, comprising, a. A ferret including a cylinder and a piston, each having means associated therewith for substantially obstructing fluid flow therepast,
 b. Means disposed within said ferret and responsive to pressure change within the ferret as it passes over a leak aperture to effect release of pressurized gas to propel the piston within the cylinder, for generation of sonic waves in both upstream and downstream directions through the pipeline fluid.

5. The device of claim 4 wherein the piston is of a diameter substantially less than the pipeline interior to define an annular chamber therebetween in which a pressure drop occurs as the ferret passes over a leak aperture.

6. A pipeline leak detector having an elongate body portion adapted for disposition within a pressurized fluid pipeline and comprising a pair of telescopically asscaited members defining a piston and a closed end cylinder, a. means disposed within said piston for actuation of a signal in response to a pipeline leak over which the detector passes,
 b. means associated with said piston and cylinder to define with the pipeline inner wall an enclosed space in which a bounded volume of the stream fluid is substantially isolated from the mainstream,
 c. means for limiting the stroke of the piston within the cylinder,
 d. means housed within said piston and responsive to said leak signal for the release of pressurized gas into a chamber between said piston and the cylinder end,
 e. valve means associated with said cylinder end and normally biased open for fluid flow between the stream and the chamber and adapted to be instantly closed by the release of pressurized gas into the chamber,
 f. and packing elements carried respectively by said piston and cylinder to limit fluid flow thereby, whereby as the detector passes a leak, the signal initiated release of gas into the chamber closes the valve means and drives said packing elements apart to initiate sonic waves in both up and downstream directions within the stream.

7. The device of claim 6 including means for the concentric positioning of said cylinder and piston within a pipeline including a pair of impeding elements extending transversely of the pipeline and fixed respectively to the cylinder and piston, a. the element fixed to said piston being provided with a fluid passage leading to one side of said sensor, the opposite side of which is provided with a passage leading externally of the piston to the enclosed space between said packing elements,
 b. the packing element carried by said cylinder provided with a fluid passage to the stream, and with a check valve disposed interiorly thereof and biased open;

whereby a signal from said sensor releases the compressed gas into said chamber to close the check valve and propel the cylinder and piston apart for generation of oppositely directed sonic signals in the stream.

* * * * *